United States Patent
Ende et al.

(10) Patent No.: US 6,503,029 B1
(45) Date of Patent: Jan. 7, 2003

(54) BORING ARRANGEMENT AND METHOD FOR BORING HOLES IN OVERLAPPING WORKPIECES

(75) Inventors: Wolfgang Ende, Neu Wulmstorf (DE); Harald Schueler, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 87 days.

(21) Appl. No.: 09/688,568

(22) Filed: Oct. 16, 2000

(30) Foreign Application Priority Data

Oct. 14, 1999 (DE) .......................... 199 49 673
Jan. 28, 2000 (DE) .......................... 100 03 647

(51) Int. Cl.⁷ .......................... B23B 35/00; B23B 49/02
(52) U.S. Cl. .......................... 408/1 R; 408/67; 408/97; 409/137
(58) Field of Search .......................... 408/1 R, 67, 81, 408/82, 97; 173/198; 409/137

(56) References Cited

U.S. PATENT DOCUMENTS

| | | | | |
|---|---|---|---|---|
| 994,430 A | * | 6/1911 | Tunks ..................... | 408/56 |
| 1,831,813 A | * | 11/1931 | Levedahl ................. | 408/81 |
| 2,335,614 A | * | 11/1943 | Spievak .................. | 408/81 |
| 2,339,324 A | * | 1/1944 | Fischer ................... | 408/56 |
| 4,209,069 A | * | 6/1980 | Smith ..................... | 408/67 |
| 4,657,446 A | | 4/1987 | Flaten | |
| 4,897,000 A | | 1/1990 | Suzuki | |
| 5,078,553 A | * | 1/1992 | Dutkiewicz et al. ...... | 408/67 |
| 5,161,923 A | | 11/1992 | Reccius | |
| 5,356,245 A | * | 10/1994 | Hosoi et al. ............. | 408/67 |
| 5,404,641 A | | 4/1995 | Bratten et al. | |
| 5,584,618 A | | 12/1996 | Blankenship et al. | |
| 5,791,842 A | * | 8/1998 | Sugata ................... | 409/137 |
| 5,961,258 A | | 10/1999 | Ende et al. | |
| 5,993,122 A | * | 11/1999 | Baker ..................... | 408/67 |
| 6,264,590 B1 | * | 7/2001 | Ferrari ................... | 409/137 |

FOREIGN PATENT DOCUMENTS

| | | | | |
|---|---|---|---|---|
| DE | 3734127 A1 | * | 4/1989 | ............ 409/137 |
| DE | 4037716 | | 4/1992 | |

* cited by examiner

Primary Examiner—Steven C. Bishop
(74) Attorney, Agent, or Firm—W. F. Fasse; W. G. Fasse (57) ABSTRACT

A boring arrangement is connected to a boring machine equipped with a boring bit for boring a hole in overlapping workpieces. The boring arrangement includes a first sleeve connected to the boring machine, and a second sleeve that is movably connected to the first sleeve so as to allow a relative motion therebetween in a boring feed advance direction. Biasing elements such as springs apply a biasing force between the first and second sleeves so as to exert a pressing force through the second sleeve onto a pressing sleeve connected thereto. The boring bit moves through the interior of the pressing sleeve to bore the required hole in the workpiece. Thereby, the pressing sleeve surrounds the boring site and is seated and pressed against the workpiece with a pressing force that is greater than the boring feed advance force exerted by the boring bit onto the workpiece. A suction arrangement sucks away boring chips and other swarf material arising during the boring process. Thereby, the accumulation of swarf material in the joint areas between the two overlapping workpieces is avoided, and there is no need to separate the workpieces to remove swarf material.

26 Claims, 5 Drawing Sheets

BORING ARRANGEMENT AND METHOD FOR BORING HOLES IN OVERLAPPING WORKPIECES

PRIORITY CLAIM

This application is based on and claims the priority under 35 U.S.C. §119 of German Patent Application 199 49 673.0, filed on Oct. 14, 1999, and German Patent Application 100 03 647.3, filed on Jan. 28, 2000, the entire disclosures of which are incorporated herein by reference.

FIELD OF THE INVENTION

The invention relates to a boring arrangement to be connected to a boring machine equipped with a boring tool such as a bit for boring holes, especially in overlapping workpieces. The invention further relates to a method of boring holes using such a boring arrangement.

BACKGROUND INFORMATION

In the field of aircraft construction, the assembly of various structural components is typically carried out by boring holes in the respective components and then securing the components to each other using rivets engaged in the bored holes. To carry this out, the components are typically first laid into respective contour-determining jigs or similar apparatus. The respective joint surfaces of the components are overlapped with each other, whereby one of the workpieces has been provided with prebored pilot holes and the other workpiece is without holes. The bored holes are then formed in the overlapping joint surfaces, whereby for example the bored holes must have a critical spacing or offset away from the edge of the respective component, by means of copy-boring the pilot holes from the first workpiece onto the second workpiece that did not have any prebored holes.

For example, the fabrication of crosswise or transverse joints of an aircraft fuselage is carried out in that two large-format components are moved together so that an outer circumference of the first component is pushed over the inwardly lying transverse joint lip of the second component to form an overlap area. In order to join this overlap area, a plurality of rivet holes or bores must be prepared. To prevent mis-alignments or improper displacements between the respective bored holes that correspond to each other in the two respective components, the pilot bores that were predrilled in the first component are directly copied by copy-boring into the second component so as to form the required rivet holes. During the progress of the copy-boring process, at least some of the completed bored holes are temporarily secured by means of temporary screw connectors.

After all the required bored holes along the respective joint surface of the components have been completed, the boring chips, turnings, and other swarf material, which arose during the boring process and which have largely collected in the overlapping joint surfaces between the two components, must be removed before carrying out the riveting. This is achieved by again separating the two components and then deburring and cleaning the joint areas. As a special further step in the assembly of an aircraft fuselage, these joint areas must additionally be provided with a sealing compound. After this step, the first and second components are once again moved together into their respective final positions with an overlapping joint area in which the respective bored holes align with one another.

Temporary holding or tacking rivets are set into about half of all of the rivet holes, and now the remaining bores or holes can be bored to the required finished dimension, countersunk, deburred on the boring bit exit side, and then the respective fitting rivets are set into these holes. Thereafter the temporary holding or tacking rivets are again removed by being bored out, and also these holes in which the temporary tacking rivets had been arranged are now bored to the finished hole dimension and further prepared for receiving respective fitting rivets therein.

Due to the great number of rivet holes that are necessary for the assembly of the fuselage of an aircraft, and especially a large commercial passenger aircraft, the above described assembly sequence is very work intensive. This. is particularly, true because the components being joined must again be separated and moved apart after the required holes have been bored therein, and then the boring swarf that has accumulated in the joint surfaces between the two components must be removed as described above, through labor intensive steps. The subsequent re-overlapping of the two components requires great care to avoid positioning errors or inaccuracies which might arise with respect to the alignment of the bored holes in the two workpieces. Considerable effort is required for removing or correcting any such positioning inaccuracies that may occur.

SUMMARY OF THE INVENTION

In view of the above it is an object of the invention to provide a boring arrangement as well as a boring method of the above mentioned general type, which can considerably reduce the assembly time and effort involved in joining together components having overlapping joint surfaces, especially with a great number of rivet holes that must be bored and rivet connections that must be set therein. Particularly, it is an object of the invention to reduce the process throughput time for the fabrication of overlapping joint surfaces on structural components, for example the transverse joint assembly of an aircraft fuselage. More particularly, the invention aims to avoid the accumulation of boring chips, cuttings, turnings, and other swarf material in the overlapping joint areas of overlapped workpieces that are being bored. It is a further aim of the invention to avoid or overcome the other disadvantages of the prior art, and to achieve further advantages, as apparent from the present specification.

The above objects have been achieved according to the invention in a boring arrangement adapted to be connected to and used together with a boring machine equipped with a boring tool such as a boring bit or drill bit, especially for boring holes in overlapping workpieces. The boring arrangement includes a first element on the boring machine side and a second element on the workpiece side. In other words, the first element is generally connected to or in contact with the boring machine, while the second element is generally in contact with the workpiece. The two elements are operatively connected and cooperate with each other so as to enable a relative motion therebetween in the boring feed advance direction. The boring arrangement further includes means for transmitting a contact force or pressing force against the workpiece. The second element on the workpiece side cooperates with a pressing sleeve that can be set onto one of the workpieces, and that has an opening such that the boring bit can be guided and moved therethrough for boring a hole into at least one of the workpieces. Moreover, the boring arrangement includes an air flow or suction arrangement for removing swarf material such as chips and dust particles from the boring site, and thereby prevents the formation of a chip jam or the accumulation of swarf in the boring arrangement as well as in the joint areas of the workpieces.

The above objects have further been achieved according to the invention in a method for boring a hole in the overlapping joint area of overlapping workpieces. A first one of the workpieces has a pilot hole that has been provided therein. In the inventive method, the pressing sleeve integrated into the boring arrangement is guided and set into the pilot hole in the first workpiece, and then held against the second workpiece with a pressing force. The boring bit is guided through the pressing sleeve and pressed against the second workpiece with a boring feed advance force so as to bore the bored hole. In this context, the machining forces and particularly the boring feed advance forces arising during the boring process are always smaller than the pressing force with which the pressing sleeve is pressed against the second workpiece. Moreover, swarf material arising during the boring process is simultaneously removed during the boring process.

According to the invention, it is especially advantageous that no boring chips, turnings, dust, fiber residues, or other swarf particles can accumulate in the joint surfaces between the two overlapping components, because the swarf materials are contained in the pressing sleeve and then suctioned away. For this reason, the overall assembly process can omit the additional steps of separating and moving apart the two workpieces, deburring the bored holes, cleaning the joint areas, moving the two workpieces once again into the overlapping position, and tack-riveting or otherwise holding the two components together after the copy-boring of the tacking holes. Thus, the total number of work steps involved in the joining operation during the structural assembly of the workpieces, and especially during the transverse seam assembly of an aircraft fuselage, can be significantly reduced. This makes it possible to achieve shorter total assembly and throughput times in the overall manufacturing of components or structures such as an aircraft fuselage.

In a particular embodiment, the boring machine side first element comprises a fixed inner sleeve, while the workpiece side second element comprises a movable outer sleeve that is connected to the inner sleeve by guide bolts so as to enable a relative sliding motion between these two elements in the boring feed advance direction. Alternatively, the first element on the boring machine side may comprise a fixed outer sleeve, which has a receiver or mount for receiving the second element which comprises a movable inner sleeve, so as to enable a relative motion therebetween in the boring feed advance direction.

The above mentioned guide bolts are preferably provided with helical compression springs thereon as a simple and economical embodiment for achieving a predeterminable pressing force and providing the required operative connection between the outer and inner sleeves that form the first element and the second element, or the second element and the first element, respectively. As an alternative, a spiral spring such as a helical compression spring may be integrated into the outer sleeve element, such that this spiral spring provides the required relative motion between the outer sleeve element and the inner sleeve element, in a space saving manner that is not sensitive to fouling or contamination.

The air flow arrangement for removing swarf material preferably includes a suction opening in the boring machine-side first element, as well as a suction pipe connected to this opening. Moreover, air holes are provided in the pressing sleeve in order to establish the required air circulation. These air holes in the pressing sleeve may be in the form of plural holes distributed about the circumference of the pressing sleeve, whereby the holes are small enough so that no swarf material can penetrate radially out of the pressing sleeve through, these holes. Alternatively, the air holes in the pressing sleeve may be in the form of a gap or slot formed between overlapping flanks of the shell wall of the pressing sleeve, in such a direction that the air flowing inwardly through the gap travels in a direction tangent to the rotation direction of the boring bit. Additional bypass holes or bores may be provided in a conical portion of the second element in order to support the air circulation.

This arrangement creates an air circulation to achieve an axial transport of swarf material without allowing swarf chips or the like to escape radially outwardly out of the pressing sleeve. Thus, all of the swarf material is maintained inside the pressing sleeve, and is then sucked away by the suction arrangement. Directly in the area of the boring location, extending in a direction toward the suction pipe, a defined air channel may additionally by provided to have a cross-section matching the suction pipe, in order to prevent a so-called cyclone effect which would otherwise tend to reduce the air flow velocity and thereby cause the swarf material to settle out of the air flow. Thereby, an advantageous flushing air flow is maintained to flush the swarf material away from the boring location and into the suction pipe, where it is sucked away.

Regarding the combination or interaction between the boring arrangement and the boring machine, various embodiments are possible. For example, the boring arrangement may generally be arranged as an accessory on the front or working end of the boring machine, whereby the first element is secured to the boring machine via a threaded receptacle, and whereby this first element at least partially encloses and surrounds the boring bit. Alternatively, the first element may be embodied as a sleeve that is connected via a receiver or mount to the boring machine, preferably by means of a clamping screw or other fastening device that prevents a relative rotation therebetween.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1A:
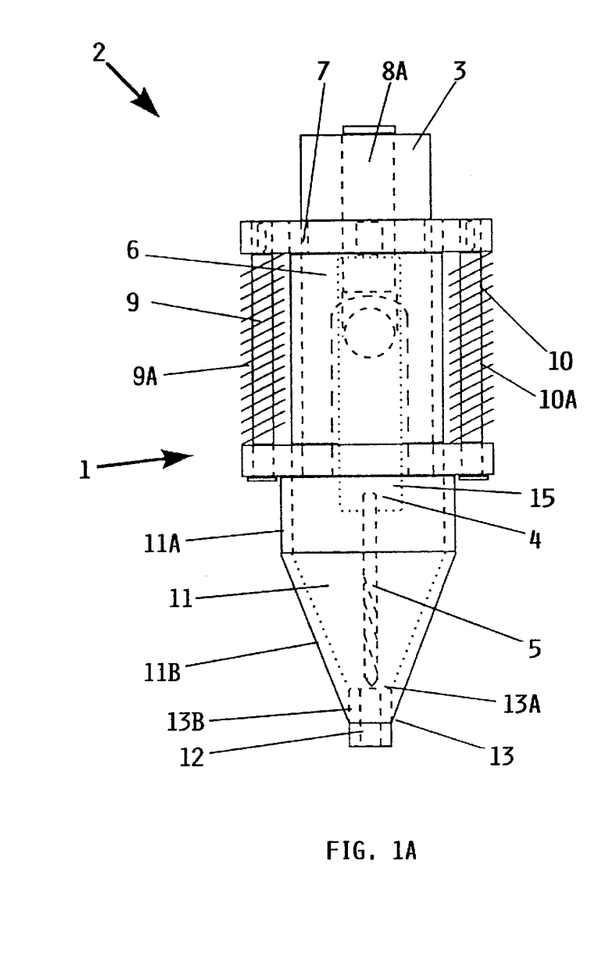
FIG. 1A is a schematic front view of a first embodiment of a boring arrangement according to the invention, as a part of an overall boring apparatus or device.
Figure 1B:
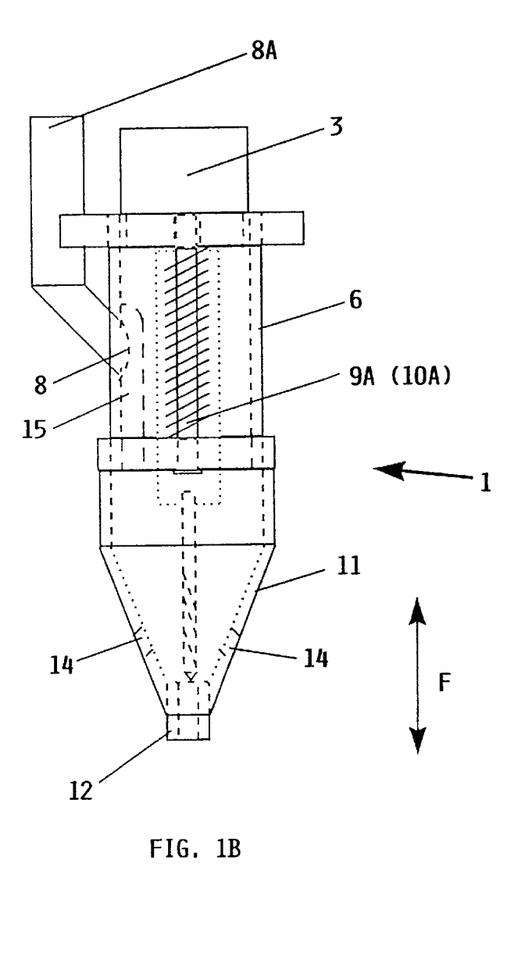
FIG. 1B is a schematic side view of the boring arrangement of FIG. 1A.

FIGS. 1A and 1B show two views of a boring arrangement 1 which forms a part of an overall boring device or apparatus 2, which further includes a typical conventional boring machine 3 on which the boring arrangement 1 can be mounted and secured. The boring arrangement 1 comprises a fixed inner sleeve 6, which includes a threaded receptacle 7 at one end thereof forming a connection or mounting region for connecting to the boring machine 3. The inner sleeve 6 is thus screwed onto a threaded portion on the forward end of the boring machine 3 via the threaded receptacle 7. The inner sleeve 6 has a hollow interior space that is sufficiently large for receiving and enclosing therein, the chuck 4 and the boring bit 5 of the boring machine 3.

A chip suction arrangement and particularly a chip suction opening 8 is further provided in the inner sleeve 6, and a suction pipe 8A is connected thereto, so as to suck boring chips, turnings, fiber residues, and other swarf material away from the boring bit tip in the axial direction and out through the suction pipe 8A. Externally, the suction pipe 8A is connected to any conventional source of a suction air flow.

A movable outer sleeve 11 is operatively and movably connected to the inner sleeve 6 via spring loaded guide bolts 9 and 10 that are respectively equipped with spiral biasing springs 9A and 10A such as helical compression springs, in such a manner so that a relative motion is enabled between the outer sleeve 11 and the inner sleeve 6 in the boring feed advance direction shown by the arrow F. The outer sleeve 11 comprises a cylindrical rear sleeve component 11A, in which the inner sleeve 6 can relatively move, as well as a conical forward sleeve component 11B that includes a receptacle 13 at a forward end thereof for receiving a pressing sleeve 12. The receptacle 13 includes an inner stop 13A and a holding member 13B. The pressing sleeve 12 may be pushed into the receptacle 13 and then laterally held by the holding member 13B while being stopped and restrained in the lengthwise or axial direction by the inner stop 13A. In this manner, the pressing sleeve 12 is fixedly held, yet easily exchangeable and may therefore be replaced whenever needed without complicated and costly assembly steps.

This pressing sleeve 12 is preferably a relatively thin-walled sleeve which can be set into a pilot hole as will be described below, while allowing the boring bit 5 to pass through the hollow interior thereof. Thus, the pressing sleeve 12 is preferably thin-walled, because in certain applications, there is not much difference between the outer diameter of the boring bit 5 that must fit within the sleeve 12 and the inner diameter of the pilot hole into which the outside of the sleeve 12 must fit.

The pressing sleeve 12 further has air openings therein in order to achieve a sufficient air circulation for effectively flushing and then sucking away the chips and other swarf material from the bore hole location and then transporting the swarf material in an axial chip transport direction toward the chip suction pipe 8A. The air openings in this context are so embodied that chips cannot exit in a radial direction out of the pressing sleeve 12, as will be described in detail below with reference to FIGS. 3 and 4. In order to further support the air circulation, additional bypass bores 14 are preferably provided in the conical forward sleeve component 11B of the outer sleeve 11. It is further also possible to arrange an air channel 15 in the interior of the inner sleeve 6, whereby this air channel 15 has a cross-section that matches that of the chip suction arrangement or opening 8. The channel 15 may be an added-on component, or may be formed or let into the wall of the sleeve 6. With such an embodiment, a so-called cyclone effect can be prevented. Namely, this arrangement of air flow holes and passages prevents a reduction of the air flow velocity which would lead to a consequent dropping or disentrainment of the swarf material.

Figure 2:
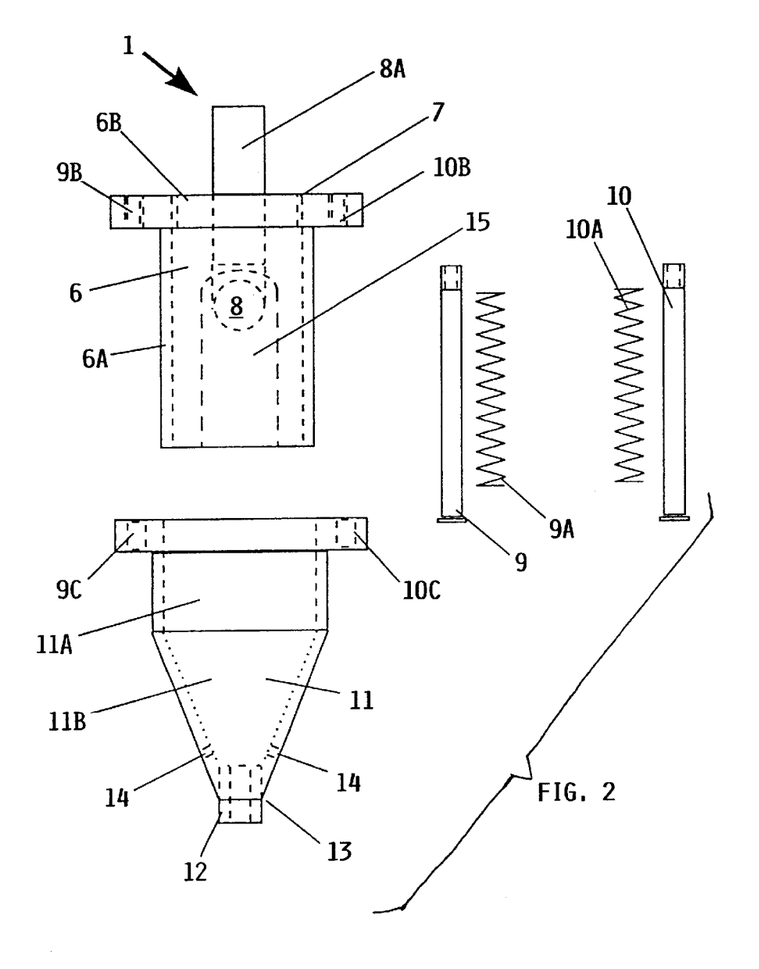
FIG. 2 is a schematic exploded view of separate components of the boring arrangement of the first embodiment.

Now referring to FIG. 2, the separate components of the boring arrangement 1 are shown individually in an exploded view, to provide a better understanding in connection with the following explanation. It is apparent that the inner sleeve 6 comprises a thin-walled cylindrical guide tube or pipe 6A, which is adapted to enclose or surround the boring machine chuck 4 as well as the boring tool such as the bit 5 of the boring machine 3. The chip suction arrangement 8 is especially provided by an opening 8 in the guide pipe 6A, onto which the chip suction pipe 8A is connected. The air channel 15 is let into or arranged in the guide pipe 6A, extending substantially in the boring bit lengthwise direction. A receiver or mount 6B is arranged on the guide pipe 6A, and comprises the above-mentioned threaded receptacle 7 that serves to connect the inner sleeve 6 to the boring machine 3. Furthermore, bolt receiving holes 9B and 10B are provided in the mount 6B, whereby these bolt receiving holes 9B and 11B are adapted to have the guide bolts 9 and 10 respectively screwed and secured therein. A respective spiral spring 9A and 10A is arranged concentrically around each respective guide bolt 9 and 10.

The outer sleeve 11, comprising the cylindrical rear sleeve component 11A and the conical forward sleeve component 11B, further comprises bolt guides 9C and 10C for receiving and slidingly guiding the guide bolts 9 and 10. Thereby, the spring loaded guide bolts 9 and 10 provide for the relative motion between the outer sleeve 11 and the inner sleeve 6 in the boring bit lengthwise direction or boring feed advance direction F (see FIG. 1B). As has already been described above, the receptacle 13 for receiving the pressing sleeve 12 is arranged on the forward end of the outer sleeve 11. Two different alternative embodiments of the pressing sleeve 12 will be described next in connection with FIGS. 3A and 3B and FIGS. 4A and 4B respectively.

Figure 3A:
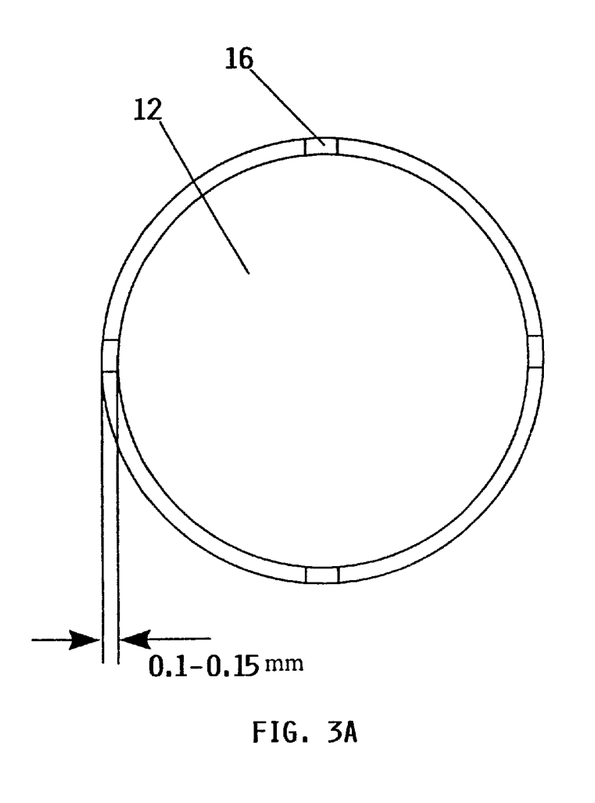
FIG. 3A is an enlarged end view of a first embodiment of a pressing sleeve of the inventive boring arrangement.
Figure 3B:
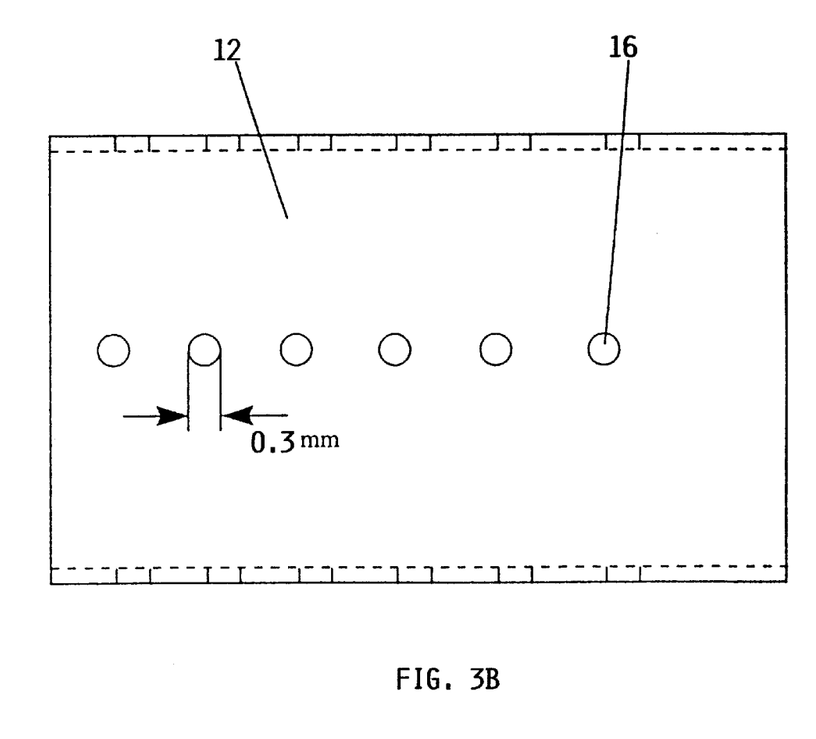
FIG. 3B is an enlarged side view of the first embodiment of the pressing sleeve shown in FIG. 3A.

FIGS. 3A and 3B show a first embodiment of the pressing sleeve 12 schematically on an enlarged scale. In this embodiment, the above-mentioned air openings in the pressing sleeve 12 are particularly embodied as air holes 16 extending radially through the wall of the pressing sleeve 12. The wall of the pressing sleeve 12 is rather thin, preferably with a wall thickness of about 0.1 to 0.15 mm. The air holes 16 are simple bored holes having a diameter, for example, of about 0.3 mm, and being uniformly distributed about the circumference of the pressing sleeve 12. It is also possible to provide one or more air holes directly at the edge or end surface of the pressing sleeve 12, for example in the form of notches or half-round cut-outs provided in the end surface of the sleeve 12. Particularly, the number, size, and location of the air holes 16 is selected to achieve such an air circulation so that the suction air that flows in a direction toward the suction pipe 8A entrains and transports the chips and other swarf material in the axial direction. On the other hand, the size or diameter of the air holes 16 is limited so that chips and other swarf material that are formed during the boring process and are to be sucked away cannot penetrate outwardly through the air holes 16 to exit the pressing sleeve 12 and also will not plug the air holes 16.

Figure 4A:
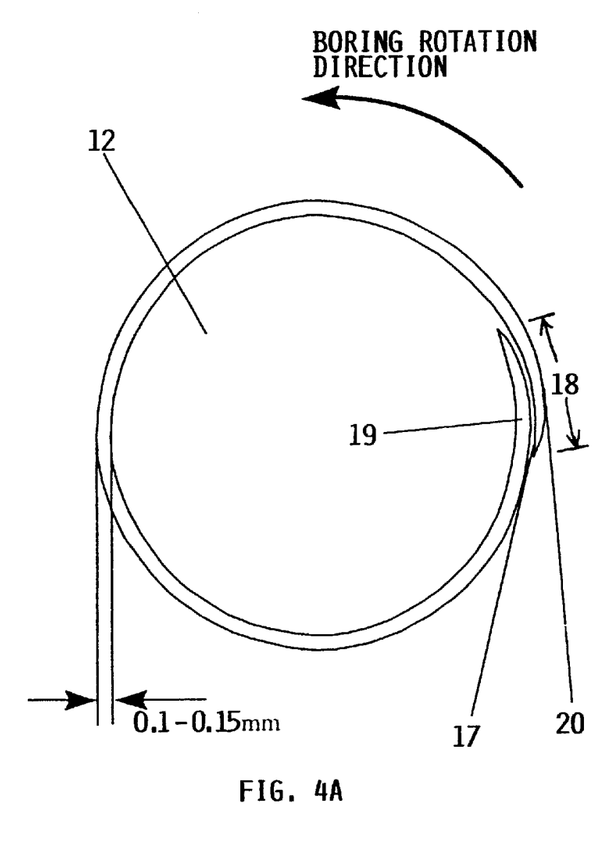
FIG. 4A is a schematic end view similar to that of FIG. 3A, but showing a second embodiment of a pressing sleeve according to the invention.
Figure 4B:
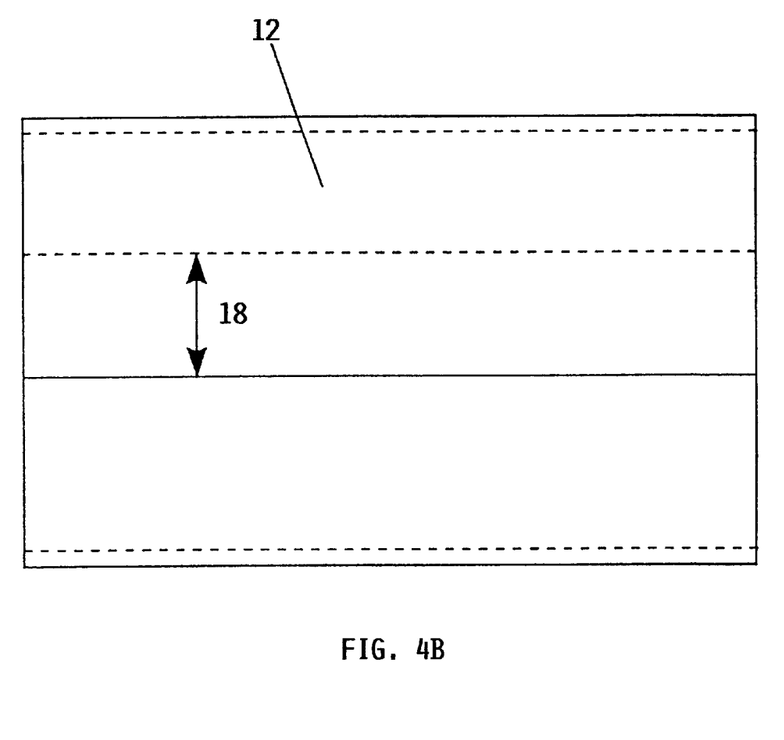
FIG. 4B is a schematic side view generally corresponding to that of FIG. 3B, but showing the second embodiment of a pressing sleeve according to FIG. 4A.

FIGS. 4A and 4B show a second embodiment of the pressing sleeve 12 in an enlarged scale. In this embodiment, the air opening or openings are formed by a slot or gap 17 extending in a lengthwise direction along the length of the pressing sleeve 12. The gap 17 is particularly formed as a gap 17 between two overlapping edge flanks 19 and 20 of the sleeve shell that forms the pressing sleeve 12. In other words, the pressing sleeve 12 is not a continuous closed cylindrical sleeve, but rather a cylindrically rolled wall sheet forming a shell, by overlapping the edge flanks 19 and 20 in an overlapping region 18, with the gap 17 remaining therebetween. The size and configuration of the overlap region 18 is selected so that an air flow flowing into the pressing sleeve 12 supports the chip transport in the axial direction, and so that no swarf material can exit in a radial direction or plug the gap 17. For this reason, the edge of the inner flank 19 preferably extends in the rotation direction of the boring bit 5, while the outer flank 20 ends in a direction contrary to the rotation direction of the boring bit 5. Thereby, it is ensured that the gap 17 will provide an air flow that flows into the hollow interior space of the pressing sleeve 12 in a direction that corresponds to the boring rotation direction. As described above for the first embodiment, the pressing sleeve 12 of this second embodiment is rather thin-walled, for example having a wall thickness of about 0.15 mm, with a sleeve length of approximately 20 mm and a diameter of approximately 4 mm.

Figure 5:
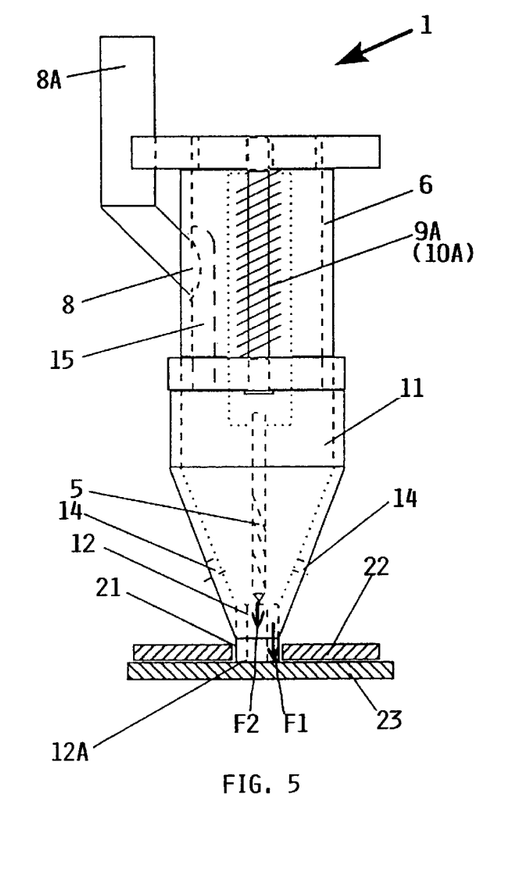
FIG. 5 is a schematic side view generally corresponding to that of FIG. 1B, but showing the boring arrangement in a working position in connection with two overlapping workpieces.

FIG. 5 shows the inventive boring arrangement 1 in a working position in which the boring arrangement 1 is mounted as an accessory on a conventionally known boring machine, which is not shown in detail. The pressing sleeve 12 of the boring arrangement 1 is guided into an existing prebored pilot hole 21 of a first sheet metal workpiece 22, in order to be able to bore a hole in a second sheet metal workpiece 23 on which the first sheet metal workpiece 22 is overlapped. The outer diameter of the pilot hole 21 is in the range from about 2.8 mm to about 5.2 mm for the special rivet connections that are to be fabricated in the assembly of an aircraft fuselage. Naturally, other diameter ranges are possible for different applications, whereby the particular design and construction of the boring arrangement 1 must take into account the strength and loadability of the pressing sleeve 12 in relation to the necessary pressing forces and machining or boring forces. The boring arrangement 1 is so constructed that the machining or boring forces arising during a boring process. are always smaller than the pressing force with which the pressing sleeve 12 is pressed against the second workpiece 23. This balance of forces is largely determined by the spring force and particularly the spring constant and other characteristics of the spiral springs 9A and 10A arranged on the guide bolts 9 and 10. Namely, to begin the boring process, the exposed end surface 12A of the pressing sleeve 12 is pressed against the un-bored workpiece 23 with a pressing force F1 before the boring bit 5 reaches the workpiece 23 so as to begin the machining or boring process.

Then, to carry out the boring process, the boring machine and the inner sleeve 6 connected thereto must be pushed farther in a boring feed advance direction, with a force sufficient to overcome the biasing force of the springs 9A and 10A integrated into the arrangement 1. After overcoming this spring force, the inner sleeve 6 together with the boring machine and boring bit 5 are moved toward the boring location, while the springs 9A and 10A continue to exert the reactive force on the outer sleeve 11 and thereby press the pressing sleeve 12 against the workpiece 23. The tip of the boring bit 5 then reaches the surface of the workpiece 23 and begins the boring process. During this feed advance of the boring bit 5 together with the inner sleeve 6, a relative motion between the inner sleeve 6 and the outer sleeve 11 is carried out. Due to this relative motion, the spiral springs 9A and 10A are progressively compressed and loaded so that the machining force or boring force F2 exerted by the boring bit 5 on the workpiece 23 is always less than the pressing force F1 exerted by the pressing sleeve 12 on the workpiece 23.

Thereby, it is ensured that the end surface 12A of the pressing sleeve 12 is always pressed and seated firmly against the surface of the second workpiece 23, so that no boring chips or other swarf material can get out of the pressing sleeve 12 and into the joint space or gap between the two workpieces 22 and 23. As shown in FIG. 5, a gap can thus be allowed to remain between the overlapped workpieces 22 and 23, and it is not necessary to clamp or press the workpieces tightly to each other, without any danger of swarf material becoming lodged in the remaining gap between the workpieces. Instead, all of the swarf material is surely contained within the pressing sleeve 12, and is then sucked out of the pressing sleeve 12 as described above. For this reason, it is possible,to carry out the boring and joining process without again separating the overlapping workpieces 22 and 23, cleaning the joint areas, once again overlapping the workpieces, and then tacking together the workpieces after the boring process has been carried out.

In the above described embodiment, the inventive boring arrangement has been applied for boring a hole in overlapping sheet metal workpieces. In addition to such a boring of metallic workpieces, the present boring arrangement can also be used for other chip removal machining processes on other materials or workpieces. For example, it is possible to bore or mill holes in lightweight structural materials and composite materials such as fiber reinforced composites like carbon fiber composites or glass fiber/aluminum laminates, whereby the arising dust and fiber residues will be effectively contained in the pressing sleeve 12 and sucked away by the chip suction arrangement 8.

In order to prevent a chip jam or blockage formed of fiber residues, dust accumulations, and the like in the boring arrangement 1, the chip suction arrangement 8 is preferably active during the entire boring process. By means of suction air applied to the suction pipe 8A, the chips or other swarf material are transported in an axial direction from the boring location away into the chip suction pipe 8A. Since the pressing sleeve 12 is tightly seated around the boring site, air openings must be provided in the pressing sleeve 12 in order to provide a sufficient air circulation. As described above, these air openings are embodied so as to support the chip transport in the suction direction, without allowing swarf material to penetrate outwardly in the radial direction. Possible embodiments of such air openings have been described above in connection with FIGS. 3A, 3B, 4A and 4B. In order to further support the air circulation, bypass bores 14 may be provided in the outer sleeve 11. Preferably, such bypass bores 14 are provided in the conical forward sleeve component 11B. In order to further improve the suction of boring chips, an air channel 15 may be provided on the interior of the fixed inner sleeve 6. This air channel 15 is matched to the cross-section of the suction pipe 8A to prevent the so-called cyclone effect which would otherwise lead to a reduction of the air flow velocity and a consequent separation and disentrainment of the chips.

Figure 6:
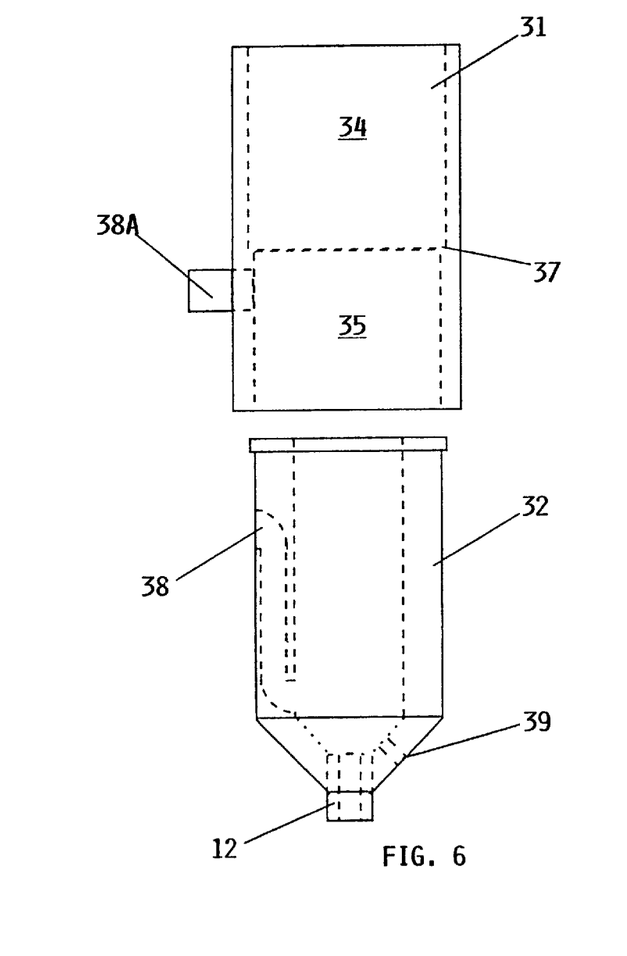
FIG. 6 is a schematic exploded view of the two major elements making up a second embodiment of the inventive boring arrangement.
Figure 7:
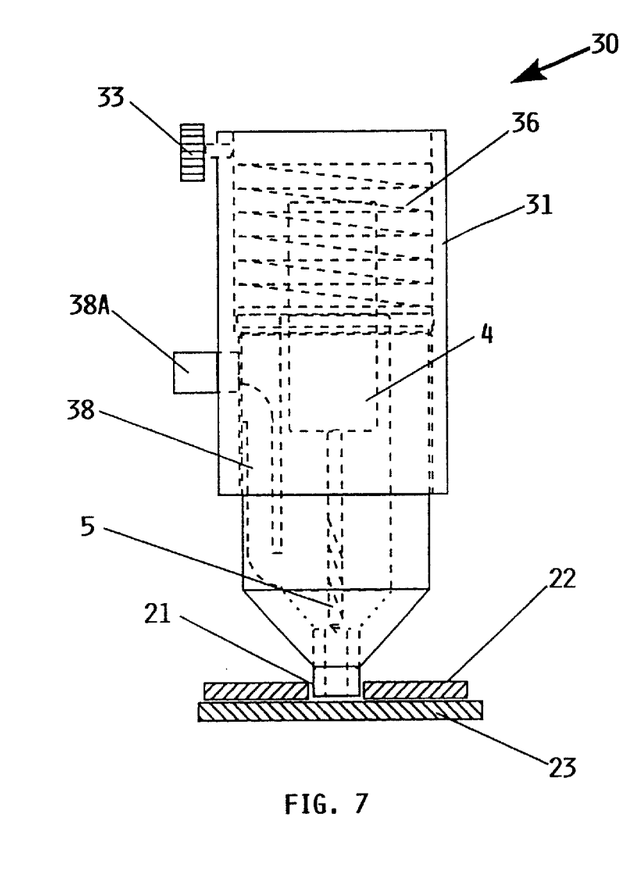
FIG. 7 is a schematic side view of the embodiment of FIG. 6, shown in a working position in connection with two overlapping workpieces.

FIGS. 6 and 7 show a second embodiment of a boring arrangement 30 according to the invention. In this embodiment, similarly, a spring-loaded relative motion is enabled between an inner sleeve 32 and an outer sleeve 31, to achieve the required pressing force of the pressing sleeve 12 against a workpiece while guiding the boring bit 5 through the pressing sleeve 12 to the boring site to carry out the boring process. However, contrary to the first embodiment of a boring arrangement 1 described above, in this second embodiment it is the outer sleeve 31. that is provided on and connected to the boring machine, while it is the inner sleeve 32 that carries the pressing sleeve 12. A biasing spring 36 is arranged in the outer sleeve 31 and biased against the inner sleeve 32. This achieves an advantage in that the guide bolts 9 and 10 arranged outside of the sleeves 6 and 11 as shown in FIG. 1 for the first embodiment, can be omitted, and instead an internal guidance and spring-loading between the outer sleeve 31 and the inner sleeve 32 is achieved. Thereby, the total number of required individual parts is reduced, space and bulkiness are reduced, and the sensitivity of the arrangement to soiling or contamination is also reduced.

The particular details of this embodiment will now be described. FIG. 6 shows the two essential components, namely the fixed outer sleeve 31, as well as the movable inner sleeve 32 with the pressing sleeve 12 arranged thereon. The outer sleeve 31 comprises a receiver or mount 34 for securing the arrangement 30 on the boring machine. In this context, the receiver or mount 34 is configured so that it can be pushed onto the forward portion of the boring machine, while still allowing enough space within the hollow interior of the hollow sleeve 31 for guiding the boring bit 5 and the chuck 4 of the boring machine therethrough. A clamping screw 33 or the like is provided for securing the outer sleeve 31 onto the boring machine. Alternatively, it is possible to provide securing catches, clamps or other elements on the receiver or mount 34 or on the mounting area of the boring machine that prevent a relative rotation of these two components.

A spiral spring 36 matching the inner diameter of the receiver or mount 34 is inserted into this area of the outer sleeve 31 in order to apply a spring load to the inner sleeve 32 that is movably received and guided in the outer sleeve 31. The inner sleeve 32 is retained in the outer sleeve 31 in the boring feed advance direction by means of a stop surface or stop edge in the outer sleeve 37. The inner sleeve 32 is movably guided within the cylindrical receiver or mount portion 35 of the outer sleeve 31, so that the movement of the inner sleeve in the boring feed advance direction is limited on the one hand by the spring 36 and on the other hand by the stop surface or edge 37. Particularly, a radially protruding flange or lip of the inner sleeve 32, is constrained between the spring 36 and the stop edge 37.

The pressing sleeve 12 is arranged in the forward portion of the inner sleeve 32. A suction channel 38 is provided in the sleeve shell of the inner sleeve 32. In this context, the suction channel 38 transports boring chips and swarf material away from the boring bit tip in a direction toward the suction pipe connection 38A provided in the outer sleeve 31 for the suction pipe, during the boring process. As can be seen in FIG. 7, the suction pipe connection may be configured and located so that it only aligns with the suction channel 38 while the sleeves 31 and 32 are somewhat compressed together during the boring process, and not when the arrangement 30 is in its resting configuration while a boring process is not being carried out. Thereby, the suction air flow is automatically shut off when it is not needed, so as to reduce the total suction air demand. In order to further improve the air delivery during the suction process, at least one bypass bore 39 is provided in the conical forward portion of the inner sleeve 32.

FIG. 7 shows the boring arrangement 30 in a working position, whereby the pressing sleeve 12 has been guided and set into a prebored pilot hole 21 that has been provided in the first sheet metal workpiece 22, in order to bore a hole in the second sheet metal workpiece 23. As already described above in connection with the first embodiment, the present boring arrangement 30 is configured, arranged and constructed in such a manner so that the boring feed advance force applied during the boring process is always less than the pressing force with which the pressing sleeve 12 presses against the workpiece 23. The pressing force is transmitted from the boring machine and the outer sleeve 31 via the spring 36 to the inner sleeve 32, and from there to the pressing sleeve 12. Thus, the spring characteristics of the spring 36 determine the pressing forces.

When the boring machine is moved forward in a feed advance motion, first the pressing sleeve 12 is pressed against the workpiece 23. After overcoming the spring force of the spring 36, the outer sleeve 31 moves together with the boring machine and the chuck 4 so that the boring bit 5 moves through the interior of the pressing sleeve 12 to contact the boring site on the workpiece 23 and begin the actual boring process. Simultaneously, a relative motion between the inner sleeve 32 and the outer sleeve 31 takes place, such that the spiral spring 36 is compressed and loaded progressively in such a manner so that the boring feed advance force exerted by the boring bit 5 onto the workpiece 23 is always less than the pressing force exerted by the pressing sleeve 12 onto the workpiece 23. In this manner it is ensured that the pressing sleeve 12 is always firmly seated against the workpiece 23, so that no swarf material can get into and collect in the joint surfaces between the two workpieces 22 and 23.

In order to prevent a chip jam or accumulation of swarf material in the boring arrangement 30, the various swarf materials are transported by means of suction air in an axial direction away from the boring site and into the chip suction pipe 38A that leads into a chip suction pipe. For this purpose, a suction channel 38 is preferably provided in the inner sleeve 32. Since the pressing sleeve 12 is tightly pressed against the workpiece around the boring site, air openings must be provided in the pressing sleeve 12 in order to provide a sufficient air circulation to support the chip transport in the suction direction, without allowing chips to emerge radially out of the pressing sleeve 12 through these air openings. Possible embodiments of such air openings in the pressing sleeve 12 have already been described above with reference to FIGS. 3 and 4, whereby such air openings also apply to this second embodiment of a boring arrangement 30. In order to further support the air circulation, it is advantageous to provide one or more bypass bores 39, in the inner sleeve 32.

Throughout this specification, references to a "fixed" sleeve, such as the fixed inner sleeve 6 in the first embodiment or the fixed outer sleeve 31 in the second embodiment, are used relative to the boring machine. In other words, in the first embodiment the inner sleeve 6 is "fixed" relative to the boring machine while the outer sleeve 11 is movable relative to the boring machine.

Throughout this specification, the air flow arrangement or suction means for removing swarf material can comprise any combination of holes, passages, channels, grooves, ducts, tubes, pipes, or the like to which a suction air flow or alternatively a blowing air flow is communicated, in order to flush and transport away the swarf material generated during the boring operation.

As alternatives to the biasing springs 9A, 10A or 36 described above, any known resilient biasing arrangement can be used to exert the required biasing force for the relative motion between the inner and outer sleeves of the boring arrangement. For example, any known configuration of springs, elastic members, hydraulic cylinders, or pneumatic cylinders, could be used instead of spiral springs.

Guide bolts or rods with concentric springs arranged thereon, as shown in the embodiment of FIG. 1A, could additionally or alternatively be provided on the embodiment of FIG. 6. Similarly, the embodiment of FIG. 1A could omit the guide bolts and external springs by instead using an internal spring arranged within the outer sleeve so as to bias the inner sleeve, in a manner similar to that shown in FIG. 7 but with the inner and outer sleeves reversed.

While the illustrated embodiments all show the inner and outer sleeves being substantially in the form of circular cylindrical shells (with a conical extension portion in the case of the workpiece side sleeve), this is not a limitation of the invention. Rather, the sleeves may be square, or rectangular or oblong in cross-section, if such shapes are better suited for particular applications, e.g. for mounting on boring machines having particular shapes.

Throughout this specification, the "boring machine" can be any known drill or machine for boring holes, such as a manual portable drill or a boring machine mounted on a boring robot or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A boring arrangement adapted to be connected to a boring machine equipped with a boring bit for boring a hole in a workpiece, said boring arrangement comprising:
   a first element adapted to be secured to the boring machine;
   a second element that is movably connected to said first element so as to enable a relative motion between said first and second elements in a boring feed advance direction;
   a resilient biasing arrangement interposed between said first and second elements so as to bias said first and second elements apart from one another in said boring feed advance direction and so as to transmit a pressing force from said first element to said second element through said resilient biasing arrangement;
   a pressing sleeve that is connected to said second element at an end thereof facing away from said first element, and that has an end surface adapted to be pressed against the workpiece whereby said pressing force is transmitted from said second element through said pressing sleeve onto the workpiece, and that has a hollow interior space therein adapted to allow the boring bit to pass therethrough in said boring feed advance direction so as to contact the workpiece and bore a hole therein; and
   an air flow arrangement arranged in at least one of said first element, said second element and said pressing sleeve and adapted to cause an air flow that removes boring swarf from said hollow interior space of said pressing sleeve;
   wherein said air flow arrangement includes at least one air hole provided in a sleeve wall of said pressing sleeve, a suction opening provided in one of said first and second elements, and a suction pipe that communicates with said suction opening and is adapted to be connected to a source of suction; and
   wherein said sleeve wall includes two edge flanks that overlap each other circumferentially in a spiral fashion, and said at least one air hole comprises a lengthwise extending gap between said two edge flanks.

2. The boring arrangement according to claim 1, wherein said gap communicates into said hollow interior space in said pressing sleeve in a direction adapted to be tangent to and corresponding to a rotation direction of the boring bit.

3. A combination for boring a hole in a second sheet workpiece that is to be joined to a first sheet workpiece, comprising:
   a boring machine equipped with a boring bit;
   a first sheet workpiece having a pre-existing pilot hole therein;
   a second sheet workpiece in which a new hole is to be bored and which is to be joined to said first sheet workpiece, wherein said first sheet workpiece is overlapped on said second sheet workpiece without being clamped together and with an overlap gap remaining therebetween; and
   a boring arrangement comprising:
      a first element secured to said boring machine;
      a second element that is movably connected to said first element so as to enable a relative motion between said first and second elements in a boring feed advance direction;
      a resilient biasing arrangement interposed between said first and second elements so as to bias said first and second elements apart from one another in said boring feed advance direction and so as to transmit a pressing force from said first element to said second element through said resilient biasing arrangement;
      a pressing sleeve that is connected to said second element at an end thereof facing away from said first element, and that extends entirely through said pilot hole in said first sheet workpiece and bridges said overlap gap and reaches said second sheet workpiece, wherein said pressing sleeve has an end surface which is seated and pressed directly against said second sheet workpiece whereby said pressing force is transmitted from said second element through said pressing sleeve directly onto said second sheet workpiece without pressing said first sheet workpiece against said second sheet workpiece, and wherein said pressing sleeve has a hollow interior space therein allowing said boring bit to pass therethrough in said boring feed advance direction and to contact said second sheet workpiece and bore the new hole therein; and
      an air flow arrangement arranged in at least one of said first element, said second element and said pressing sleeve and adapted to cause an air flow that removes boring swarf from said hollow interior space of said pressing sleeve.

4. The combination according to claim 3, wherein said pressing sleeve is a thin-walled cylindrical sleeve having a wall thickness in a range from 0.1 mm to 0.15 mm.

5. The combination according to claim 3, further comprising at least one guide bolt that is secured to one of said first and second elements and slidably guided relative to another of said first and second elements so as to slidably movably connect said second element to said first element.

6. The combination according to claim 5, wherein said resilient biasing arrangement comprises a respective helical compression spring arranged concentrically on each respective one of said at least one guide bolt between said first and second elements.

7. The combination according to claim 3, wherein said first element comprises a first sleeve, said second element comprises a second sleeve, and one of said first and second sleeves is an inner sleeve that is slidably received and guided within another of said first and second sleeves which is an outer sleeve, so as to slidably movably connect said second element to said first element.

8. The combination according to claim 7, wherein said resilient biasing arrangement comprises a helical compression spring arranged within said outer sleeve and braced between respective parts of said outer sleeve and said inner sleeve.

9. The combination according to claim 7, wherein said inner sleeve being guided within said outer sleeve provides the only guidance for the relative motion, and wherein said boring arrangement excludes all other guidance means between said first and second elements.

10. The combination according to claim 3, wherein said resilient biasing arrangement comprises a mechanical spring that is interposed between and respectively bears against said first element and said second element, and that provides the only force transmission between said first and second elements in said boring feed advance direction during the relative motion of said first and second elements.

11. The combination according to claim 3, wherein said pressing sleeve is connected rigidly yet removably to said second element.

12. The combination according to claim 3, wherein said first element comprises a first circular cylindrical sleeve, and said second element comprises a second sleeve including a cylindrical sleeve portion and a conical sleeve portion at said end of said second element facing away from said first element.

13. The combination according to claim 3, wherein said first element comprises an inner sleeve fixedly secured to said boring machine, said second element comprises an outer sleeve, and said inner sleeve is received relatively slidably in said outer sleeve and thereby movably connects said second element to said first element.

14. The combination according to claim 3, wherein said first element comprises an outer sleeve that is fixedly secured to said boring machine and that has an interior receiving space therein, and said second element comprises an inner sleeve that is slidably received in said interior receiving space of said outer sleeve and thereby movably connects said second element to said first element.

15. The combination according to claim 3, wherein said air flow arrangement includes at least one air hole provided in a sleeve wall of said pressing sleeve, a suction opening provided in one of said first and second elements, and a suction pipe that communicates with said suction opening and is adapted to be connected to a source of suction.

16. The combination according to claim 15, wherein said suction opening is provided in said first element.

17. The combination according to claim 15, wherein said suction opening is provided in said second element.

18. The combination according to claim 15, wherein said air flow arrangement further includes an air channel that communicates with said suction opening inside at least one of said first and second elements, and that extends parallel to the boring feed advance direction from said suction opening toward said pressing sleeve.

19. The combination according to claim 15, wherein said at least one air hole comprises a plurality of individual air holes distributed around a circumference of said sleeve wall of said pressing sleeve.

20. The combination according to claim 15, wherein said at least one air hole respectively has a limited size so as to prevent the boring swarf from passing out of said pressing sleeve through said at least one air hole.

21. The combination according to claim 3, wherein said air flow arrangement includes at least one bypass bore in a side wall of said second element.

22. The combination according to claim 3, wherein said boring machine includes an externally threaded mount, said first element includes an internally threaded receptacle into which said threaded mount of said boring machine is screwed so as to secure said boring arrangement onto said boring machine, and said second element at least partially surrounds said boring bit.

23. The combination according to claim 3, wherein said first element includes a receptacle into which said boring machine is received, and further comprising a fixing screw that secures said boring machine in said receptacle so as to prevent relative rotation thereof.

24. A method of using the combination according to claim 3 to bore said new hole in said second sheet workpiece that is overlapped by said first sheet workpiece which has said pilot hole therein, comprising the following steps:
  a) positioning said boring arrangement so that said pressing sleeve is placed into said pilot hole in said first sheet workpiece so that said end surface of said pressing sleeve is seated against said second sheet workpiece;
  b) pushing said boring machine toward said workpieces so that a pressing force is transmitted from said first element through said resilient biasing arrangement to said second element and further to said pressing sleeve, so as to seat and press said pressing sleeve directly against said second sheet workpiece with said pressing force;
  c) continuing said pushing of said boring machine, so as to move said boring bit forward in said boring feed advance direction through said hollow interior space of said pressing sleeve so that said boring bit is pressed with a boring feed advance force against said second sheet workpiece and bores said new hole in said second sheet workpiece at a boring site while forming boring swarf which is contained within said pressing sleeve, wherein said boring feed advance force is always maintained less than said pressing force; and
  d) during said step c) causing air to flow through said air flow arrangement so as to remove said boring swarf.

25. The method according to claim 24, wherein said step d) comprises directing said air flow to flow directly along said boring site and through said hollow interior space of said pressing sleeve along said boring bit.

26. The method according to claim 24, further comprising preventing said boring swarf from exiting out of said pressing sleeve other than via said air flow arrangement.

* * * * *